United States Patent [19]

Westberg

[11] Patent Number: 4,544,308
[45] Date of Patent: Oct. 1, 1985

[54] BORING HEAD CENTERING APPARATUS

[76] Inventor: Russell C. Westberg, 5100 W. 106th St., Bloomington, Minn. 55435

[21] Appl. No.: 481,812

[22] Filed: Apr. 4, 1983

[51] Int. Cl.[4] .............................................. B23B 29/03
[52] U.S. Cl. ...................................... 408/82; 408/709
[58] Field of Search .............. 408/75, 82, 709, 241 R, 408/81, 83, 113, 143

[56] References Cited

U.S. PATENT DOCUMENTS 3,273,423  9/1966  Rottler .................................. 408/75
3,630,632  12/1971  Holleman ............................... 408/82

Primary Examiner—Z. R. Bilinsky
Attorney, Agent, or Firm—Harold D. Jastram

[57] ABSTRACT

A boring head centering device which can be operator activated to center a boring head within a cylinder. Centering fingers extend radially from a boring head to center the boring head. The centering fingers are retracted to permit unobstructed boring with simultaneous protection of the centering mechanism from fouling.

5 Claims, 8 Drawing Figures

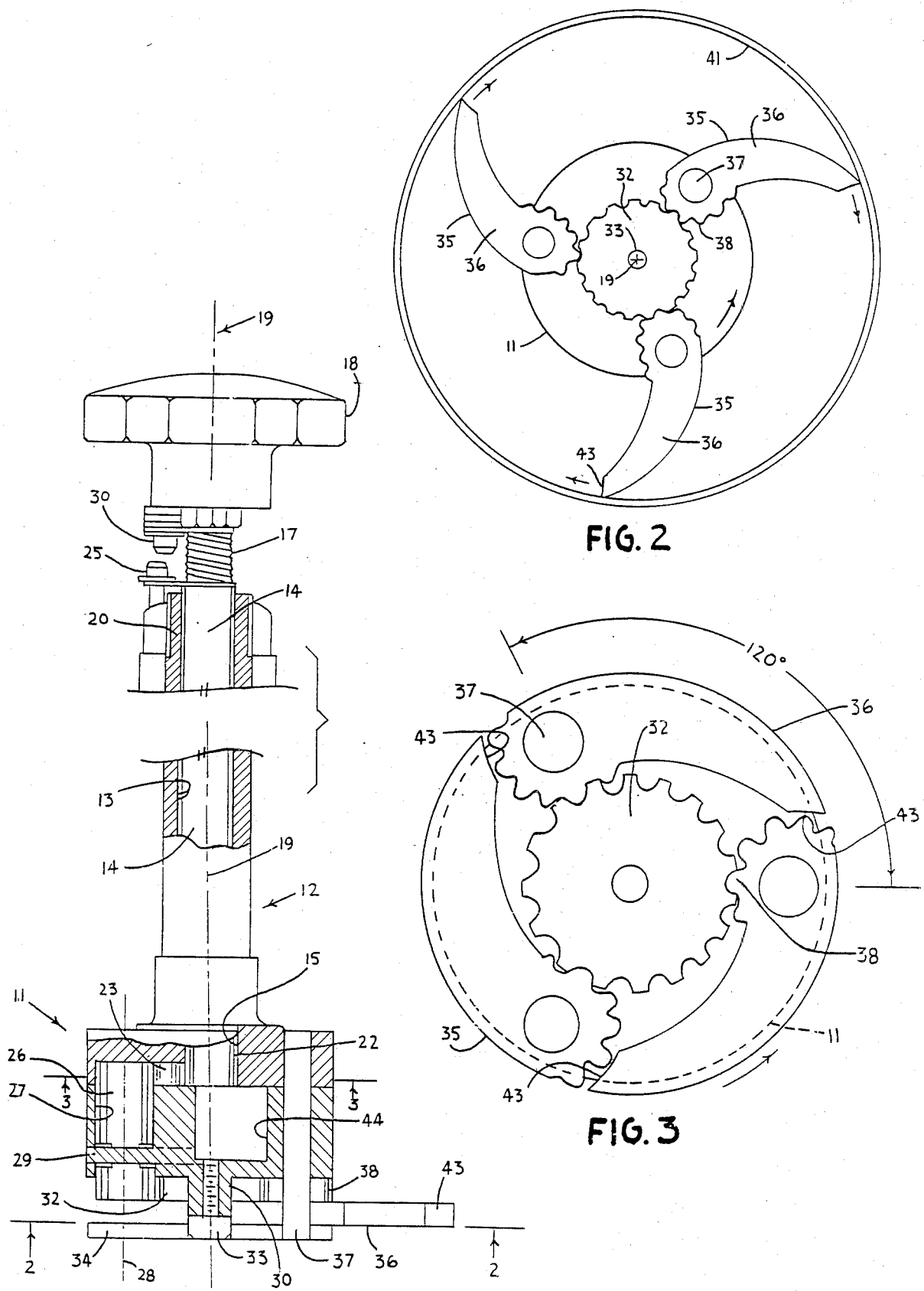

BORING HEAD CENTERING APPARATUS

BACKGROUND OF THE INVENTION

The invention relates to centering a boring head within a cylinder to be bored. Centering fingers are attached directly to the boring head to insure accurate positioning of the boring head within a cylinder of the type typically encountered in boring automotive motor blocks of original manufacture and reconditioning of motor blocks.

The machine tool industry which deals extensively with the automotive industry and the reconditioning of automotive motors, recognizes the constant need for centering devices adapted to produce accurate machine borings. The industry is confronted with the constant problem of precision boring auto-block cylinders and other cylindrical cavities. Accurately bored cylinders are necessary for the proper manufacture of motors. In new manufacture, the automotive block is typically cast and then bored to specific final dimensions. Also, in the large industry of reconditioning automotive and truck motors, there exists a constant need for accurately boring the cylinders of motor blocks. Without an accurate method of boring the old cylinders and reconditioning for reuse, these valuable parts would need to be simply discarded for new manufacture. A variety of solutions to the problem of producing accurate reborings and have been devised and put into practice.

Some of the prior art devices solve the problem of accurately centering a boring head by taking measurements from outside of the cylinder and attempting to position the boring head from measurements taking externally of the cylinder. Other prior art attempts to solve this problem by positioning the boring head with respect to the cylinder walls. Using cylinder walls as the reference point presents several problems. Accurate centering using this system can be difficult because the centering device is not permanently attached to the boring head. This presents problems because each time the boring head is moved and each time the centering device is applied to the boring head there is a chance for a slightly different positioning of the boring head within the cylinder.

Another apparatus for centering a boring head incorporates both the boring tool and the centering device in a single unit. Incorporation of the centering mechanism in the boring head tool carrier helps to insure accurate repeated centering of the boring head. An example of an apparatus of this type is illustrated in Canadian Patent Number 841317. Even this more useful and accurate method of centering, continues to present technical and physical problems to the industry. The space available for mounting such a centering device on the boring head is limited by the size of the cylinder to be bored. Because of this limited space in which to mount such a centering device, any such incorporation of the centering device on or in connection with the boring head tends to weaken the boring head. It is desirable to use a boring head which is as strong as possible to prevent any flexing of the head and tool, chattering of the spindle and bore head or similar variations which can be produced by a weak or flexible boring head.

Further, because of the limited space in which to mount a boring head, the prior art has provided mechanisms with a limited measuring range. Such centering devices have limited extension capabilities for application to a variety of cylinder sizes.

Another serious problem not totally solved by the prior art is fouling which occurs during the boring process. Cooling liquids, metal chips fine grindings and other debris is dislodged from the cylinder walls during the boring process. When centering devices are incorporated in the boring head, these centering devices tend to become fouled and therefore tend to lose operating efficiency. Fouling causes the problem of mechanical wear in the centering devices. The wear tends to be uneven so that the centering device loses accuracy and loses usefulness as a centering device. This of course requires repair of the centering fingers and possibly the boring head itself.

SUMMARY OF THE INVENTION

It is accordingly an object of the present invention to provide a device for accurately centering a boring head in a cylinder.

Another object of the present invention is to provide a boring head centering device having an extended range for permitting a wide variety of useful applications of a boring head.

It is a further object of the present invention to provide a boring head centering device incorporated with the head which does not weaken the boring head and tool mounting.

Another object of the present invention is to provide a boring head centering device which takes up very little space and permits the cutting tool to be positioned closer to the cylinder walls being bored or reconditioned.

Still another object of the present invention is to provide a boring head centering device utilizing fingers that extend radially from the boring head and which in a retracted position act as a shield for protecting the centering device and the boring head from fouling generated during boring.

DESCRIPTION OF THE DRAWINGS

FIG. 1 is a front view, partially in cross section of the invention showing an apparatus for centering a boring head;

FIG. 2 is a bottom view taken along line 2—2 of FIG. 1 showing centering fingers extended and in contact with a cylinder wall;

FIG. 3 is a bottom view showing centering fingers closed and in position for boring;

DESCRIPTION OF THE PREFERRED EMBODIMENT

Figure 4:
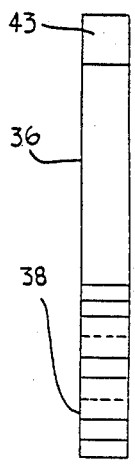
FIG. 4 is a front view of a preferred centeringg finger.

The apparatus selected to illustrate the invention has been generally depicted in FIG. 1 of the drawings which is shown partially in cross section. A boring head is generally designated by Numeral 11 and is attached to a boring head carrier 12. The boring head carrier 12 is symmetrical and is connected to the boring head 11 so that its central bore 13 is aligned with a cavity 15 in the boring head 11. A centering shaft 14 is mounted for rotation within the central bore 13 and extends into cavity 15 of the boring head 11.

The centering shaft 14 is spring loaded by a coil spring 17 so that the operator of handle 18 may rotate the handle 18 to operate and rotate the centering shaft 14. Spring 17 is connected to carrier 12 and handle 18 by bolts 25 and 30 respectively so that it returns handle 18 to its original position in a rotary direction along axis 19.

Figure 7:
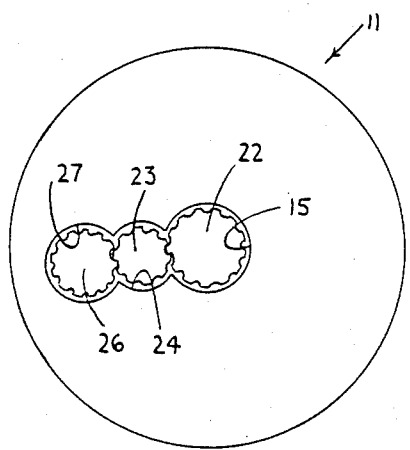
FIG. 7 is a view taken along section 3—3 of FIG. 1.

Centering shaft 14 has gear teeth 22 at the end of the centering shaft 14 which extends into cavity 15. These gear teeth 22 engage an idler pinion 23 which is mounted in cavity 24 of boring head 11. This idler gear 23 engages a boring head pinion 26 which is mounted in a third cavity 27. Pinions 23 and 26 are mounted within their respective cavities 24 and 27 with such close tolerance that the cavities act as a restraint for movement of the pinions and therefore eliminate the need for a shaft for the pinions for mounting purposes within the boring head 11. The lack of a need for a shaft for pinions 23 and 26 eliminates weakening of the boring head 11 which might result from additional room needed for mounting such shafts. The specific relationship of the pinions and the cavity walls is best illustrated in FIG. 7 of the drawings in combination with a reference to FIG. 1 of the drawings.

Figure 8:
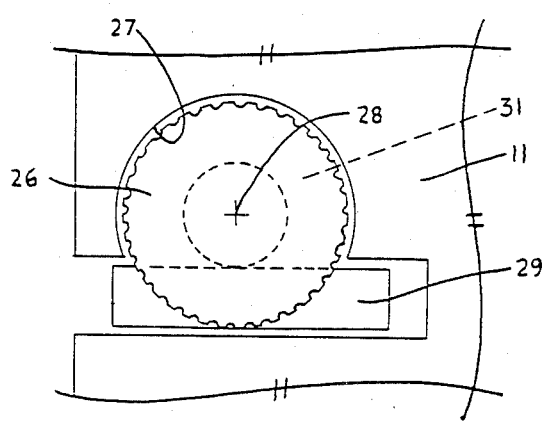
FIG. 8 is a fractional view of FIG. 1 showing a pinion mounting.

Referring again to FIG. 1 of the drawings, the boring head pinion 26 has an axis 28 which is vertical and since the head pinion 26 has no shaft for restraining movement in the vertical direction, a pin 29 is used for restraining such vertical movement as viewed in FIG. 1 of the drawings. Next refer to FIG. 8 of the drawings. Head pinion 26 has a groove 31 milled about its peripheral surface. This groove 31 is sufficiently large to permit pin 29 to be inserted in the groove. Pin 29 also is mounted in boring head 11 so that the pin is stationary and prevents boring head pinion 26 from moving vertically as viewed in FIG. 1 of the drawings. Reference to FIG. 8 of the drawings will reveal the head pinion 26 and its relationship to the pin 29 which restricts vertical movement of the head pinion 26. The head pinion 26 is captured within the cavity 27 for rotation about its axis 28.

Refer again to FIG. 1 of the drawings and particularly to a centering gear 32 is mounted on the boring head 11 and in contact with the gears of boring head pinion 26. Centering gear 32 is connected to boring head 11 and mounted on hub 30. Bolt 33 threads into hub 30 and secures a head plate 34.

The boring head plate 34 captures centering finger 36 between the boring head 11 and plate 34. Centering finger 36 is captured for rotation by a pin 37 which is mounted in boring head 11.

Refer now to FIG. 2 of the drawings which illustrates a bottom view of the centering finger 36. In a preferred embodiment of the invention, there are three fingers 36 each mounted on pins 37 in the boring head 11. These centering fingers 36 are each mounted for rotation about pin 37 through an end of the fingers 36 having a gear 38. This gear 38 is in operative engagement with centering gear 32. When gear 32 rotates, the gear 32 rotates gears 38 about pin 37 and thereby rotates the finger 36 into engagement with a wall 41 of a cylinder which is to be bored.

When each of the fingers 36 are operated by the centering gear 32, each of the fingers 36 extend radially outward from the boring head 11 at equal distances from the central axis 19 of the boring head assembly. These fingers 36 extend into contact with a wall 41 and when each of the fingers 36 are in contact with the wall, this contact centers the boring head 11 within the cylinder to be bored.

The fingers 36 in FIG. 2 are illustrated in the nearly fully extended position at almost the extreme extent of their range. The boring head 11 can also be positioned in cylinders of smaller diameter because the fingers 36 are designed with a curved surface 35 which are adopted to contact a cylinder wall 41 anywhere along the surface 35 and thereby center the boring head 11.

The preferred embodiment of the mechanism can now be described in its operation by referring to FIGS. 1 and 2 of the drawings. An operator wishing to center a boring head 11 within a cylinder having a cylinder wall 41 does so by rotating the handle 18 against the actions of spring 17 to rotate shaft 14. As the centering shaft 14 is rotated, gear teeth 22 engage idler pinion 23 which rotates and applies rotary motion to bore head pinion 26. Rotation of boring head pinion 26 in turn causes rotation of centering gear 32 which in turn causes rotation of centering gear 32 which in turn engages and rotates gears 38 which are a part of fingers 36. This rotation of gear 38 causes the centering fingers 36 to rotate about pins 37 so that the fingers 36 extend radially out from the boring head 11 to engage cylinder wall 41 and thereby center the boring head 11 within a cylinder 42.

When the operator has centered the boring head 11 in this fashion, the centering fingers 36 are returned to a closed position illustrated in FIG. 3 by merely releasing pressure on handle 18. Spring 17 now comes into operation. Release of the handle 18 causes spring 17 to rotate the shaft 14 in the opposite direction, thus, changing the direction of rotation described herein before and causing the fingers 36 to become closed as illustrated in FIG. 3 of the drawings. In this closed position the boring head 11 would now be centered for the boring operation and the fingers 36 are positioned to carry out a further function of this invention.

In the closed position, the fingers 36 of the preferred embodiment of the invention overlap the next succeeding finger to prevent boring debris from fouling the gears 38 and 32 of the centering assembly. The boring fingers are manufactured with a concave surface 43 which conform to the shape of gear 38 on the next succeeding finger to prevent debris from fouling each of the gears. In a preferred embodiment of this invention, three fingers 36 are used in the apparatus and FIG. 3 illustrates how the concave surface 43 of fingers 36 overlap and protect the gear 38 of the next succeeding finger 36. In FIG. 3, it is noted that the preferred three fingers 36 are used and are mounted 120° apart about the periphery of boring head 11.

Figure 5:
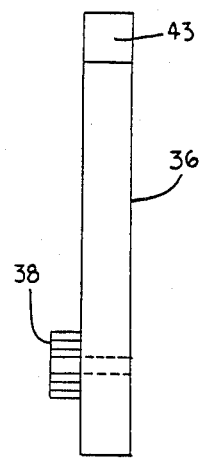
FIG. 5 is a front view of an alternate embodiment of a centering finger.

FIGS. 4 and 5 on the drawings illustrate front views of alternate embodiments of fingers 36. In FIG. 4, gear 38 is shown as a part of the finger 36. Gear 38 is simply milled into one end of finger 36 with the concave surface 43 at the opposite end thereof.

FIG. 5 on the drawings illustrates the same front view of another embodiment of finger 36. This is the style of finger illustrated in the drawing of FIG. 1. In this case, gear 38 is a separate gear mounted on the finger 36. Each embodiment of the finger 36 works equally well in the invention.

The preferred embodiment of the invention illustrates an apparatus which permits manufacture of a boring head 11 of maximum strength. The idler pinion 23, boring head pinion 26 and centering gear 32 permit the centering of fingers 36 by moving the motion of the centering action out of alignment with the axis 19 of the entire mechanism. This offsetting of the centering motion permits the boring head 11 to be manufactured with greater strength so that the boring head 11 will not be weakened in its central portion where a cutting head is mounted. In FIG. 1 of the drawings, the cutting head would be mounted into channel 44.

Figure 6:
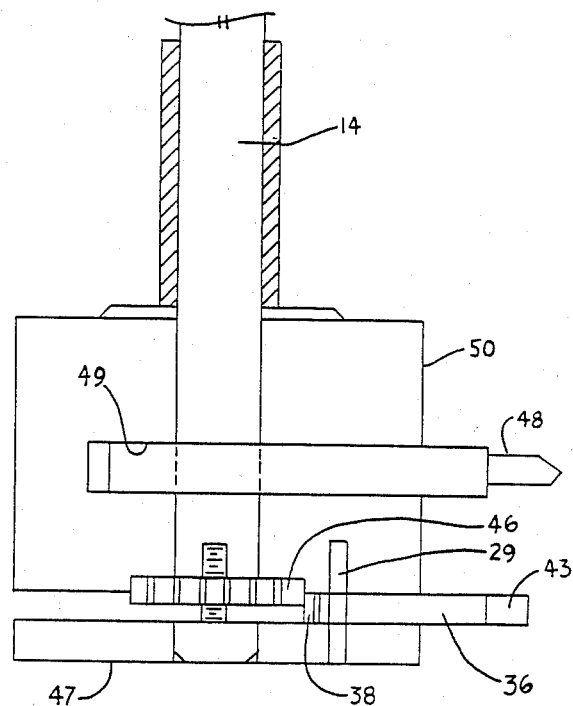
FIG. 6 is a front view, partially in cross section of an alternate embodiment of the invention showing an apparatus for centering a boring head.

Another embodiment of the invention is illustrated in FIG. 6 of the drawing in which the offset centering of the fingers 36 is not employed. In this embodiment, centering shaft 14 extends through the boring head 11. This centering shaft 14 has a centering gear 46 mounted directly on the shaft 14 for engagement with gears 38 of fingers 36. Again, fingers 36 are mounted on a pin 29 for extension and rotary action radially outward from the boring head assembly 11. A plate 47 captures fingers 36 between plate 47 and the boring head 11. As in the preferred embodiment, rotation of shaft 14 rotates gear 46 which is engaging gears 38. Rotation, therefore, extends the fingers 36 outwardly from the boring head 11 in contact with a cylinder wall as described in the preferred embodiment. A cutting tool 48 is illustrated in this FIG. 6 and is mounted in channel 49 of the boring head 11. This embodiment also employs the advantages illustrated in connection with the description of FIGS. 2 and 3 which permit centering fingers 36 to extend well beyond the periphery 50 of the boring head 11. It also employs the advantages of the fingers 36 folding about periphery of the the boring head 11 to prevent boring debris from fouling the centering mechanism.

The foregoing embodiments are merely illustrative of the principles of inventions and are not intended to be limitations on variations of the invention. Many embodiments employing the principles set forth above are possible and are incorporated within the concepts of this invention.

What is claimed is:

1. A boring head centering apparatus for centering a boring head within a cylinder which comprises a cylindrical boring head carrier having a central bore, a cylindrical boring head connected to said carrier and having a rotary axis on the rotary axis of said boring head carrier, said boring head having a first cavity, a centering pinion mounted within the bore of said carrier and extending into said first cylindrical cavity, said centering pinion having gearing at an end of said centering pinion positioned in said first cavity, said boring head having a second cavity opening into said first cavity and a third cavity opening into said second cavity, an idler pinion mounted within said second cavity and in operative contact with the gears of said centering pinion, a boring head pinion mounted in said third cavity in operative contact with said idler pinion and extending beyond said boring head, said boring head pinion having means for securing the boring head pinion within said third cavity, a centering gear mounted on said boring head and having a rotary axis along the axis of said boring head and carrier axis and in operative connection with said boring head pinion, at least three centering fingers mounted at equal distances about the periphery of said boring head, each of said fingers having gear teeth on a first end in operative contact with said centering gear, finger pins mounted in said boring head, said fingers mounted on said finger pins at said first end, a boring head plate connected to said boring head to capture the fingers between the plate and the boring head and means to rotate said centering pinion and transmit rotary motion through said centering pinion, idler pinion, boring head pinion, and centering gear to said fingers to move the fingers outwardly in an arc from said boring head and into contact with the walls of said cylinder.

2. A centering apparatus in accordance with claim 1 in which there are three fingers, each mounted 120° degrees apart on said boring head.

3. A centering apparatus in accordance with claim 1 in which each of said fingers is of a length sufficient to extend to and overlap the first end of the adjacent finger with the fingers rotated to the most closed position and in which the second end of the fingers have a cut-out shaped to accomodate the shape of said first end of the adjacent finger in such closed position.

4. A centering apparatus in accordance with claim 3 in which the fingers are generally the shape of an arc to form a circle when the fingers are rotated to such most-closed position.

5. A centering apparatus in accordance with claim 4 in which the said idler pinion floats within the second cavity.

* * * * *